United States Patent [19]

Motoshige

[11] Patent Number: 5,011,355
[45] Date of Patent: Apr. 30, 1991

[54] PUSH BUTTON TYPE FASTENER RELEASABLE BY ROTATION

[75] Inventor: Inaba Motoshige, Kanagawa, Japan

[73] Assignee: VSI Corporation, Torrance, Calif.

[21] Appl. No.: 460,857

[22] PCT Filed: Feb. 15, 1989

[86] PCT No.: PCT/US89/00618
§ 371 Date: Oct. 6, 1989
§ 102(e) Date: Oct. 6, 1989

[87] PCT Pub. No.: WO89/07719
PCT Pub. Date: Aug. 24, 1989

[30] Foreign Application Priority Data

Feb. 19, 1988 [JP] Japan .................................. 63-35414

[51] Int. Cl.$^5$ ............................................. F16B 21/00
[52] U.S. Cl. .................................... 411/552; 411/508; 411/913; 411/349
[58] Field of Search ............... 411/508, 509, 510, 913, 411/182, 349, 549, 550, 552, 553; 24/297, 453

[56] References Cited

U.S. PATENT DOCUMENTS

| | | |
|---|---|---|
| 2,200,702 | 5/1940 | Oddie ................................... 411/349 |
| 2,239,125 | 4/1951 | Summers . |
| 2,252,286 | 8/1941 | Hathorn . |
| 2,542,968 | 2/1951 | Zahodiakin . |
| 2,753,610 | 7/1956 | Miller . |
| 3,352,195 | 11/1967 | Fisher ..................................... 24/453 |
| 3,504,875 | 4/1970 | Johnson . |
| 3,842,709 | 8/1973 | Fuqua ................................... 411/350 |
| 3,893,211 | 7/1975 | Skinner ................................. 411/349 |
| 4,128,923 | 12/1978 | Bisbing . |
| 4,358,234 | 11/1982 | Takegawa ............................. 411/57 |
| 4,506,419 | 3/1985 | Mitomi ................................. 411/508 |
| 4,580,322 | 4/1986 | Wright ................................. 411/349 |

FOREIGN PATENT DOCUMENTS 2227097 12/1973 Fed. Rep. of Germany ........ 24/297
763601 12/1956 United Kingdom ................ 411/349

Primary Examiner—Rodney M. Lindsey
Assistant Examiner—F. Saether
Attorney, Agent, or Firm—Pretty, Schroeder, Brueggemann & Clark

[57] ABSTRACT

A push button type fastener for releasably joining together two panels. A stud assembly is snap-fit to one panel, and a mating socket is snap fit to the other panel. The stud assembly and the socket are releasably secured to each other merely by pushing a stud of the stud assembly toward the socket, which includes two resilient arms that move apart to receive and lock onto a thin wall portion at the stud's remote end. The stud assembly is released from the socket by rotating the stud such that the thin wall portion spreads apart the two resilient arms of the socket, to allow a spring to urge the stud out of it engagement with the socket.

5 Claims, 5 Drawing Sheets

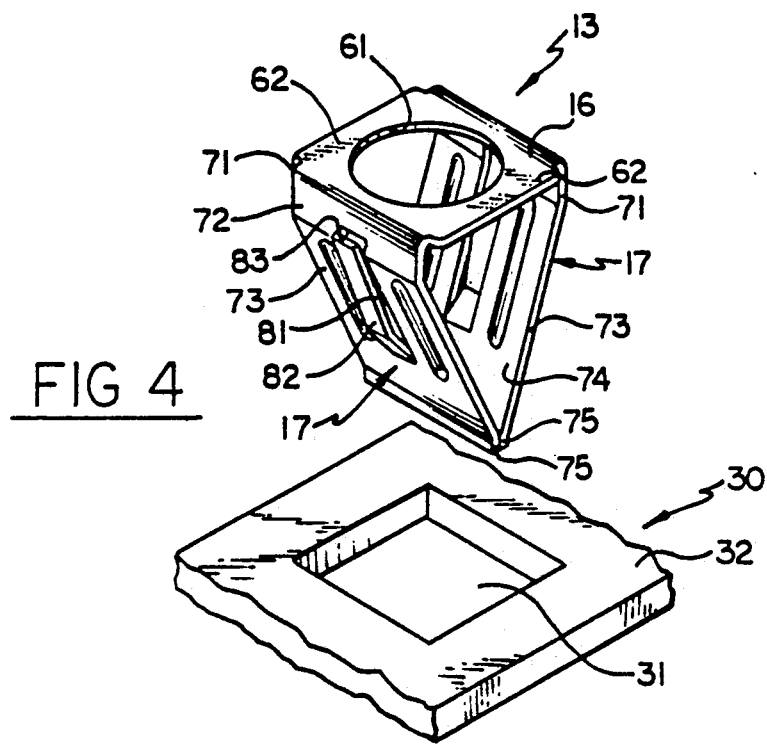
FIG 4
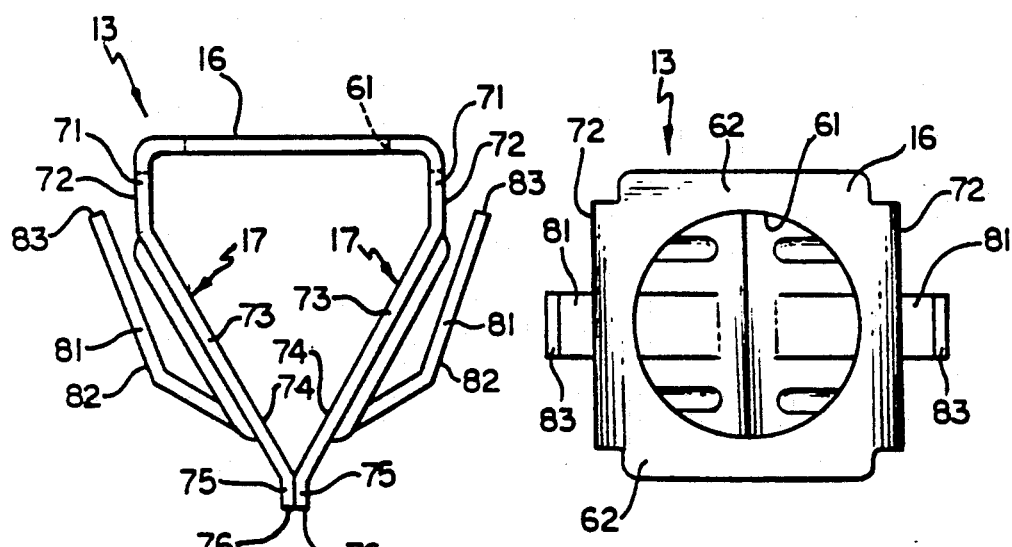
FIG 5
FIG 6

PUSH BUTTON TYPE FASTENER RELEASABLE BY ROTATION

FIELD OF THE INVENTION

The present invention relates to a push button type fastener in which two panels can be fastened together by only pushing a button, but the button must be rotated for releasing the fastening so as to open the panels. This kind of fastener has a feature that closing is easy but opening takes more time. The fastener is suitable for closing and opening a receiving portion, for example, of measuring instruments.

BACKGROUND OF THE INVENTION

One prior push button type fastener of this kind is described in a publication of a Japanese Patent 57-8323.

This push button type fastener 100, which is shown in FIG. 7, includes a stud assembly 101 that is attached to a moving side panel 20a and a socket 103 that is attached to a fixed side panel 30a. The stud assembly includes a stud 110 whose configuration has a wall portion 112 extending to a cylindrical portion 111 and a cam 114 extending from the wall portion 112 in a twisted relation via a distal portion 113, as shown in FIG. 8, and further includes a housing 120 in which the stud 110 is inserted. The stud 110 is urged upwardly by means of a compression spring 104, which is interposed between the head portion thereof and the bottom portion 121 of the housing 120. The stud is fixed to the moving side panel 20a with a fixing ring 105, which engages the flange 122 of the housing 120.

The socket 103 is provided with a pair of resilient arms 131 which gradually approach each other downwardly from a pair of the sides of a base portion 130 which is disposed in parallel with the fixed side panel 30a. Extended portions (not shown) for attaching the socket 103 to the back of the lower panel 30a by rivets or the like are extended from the other sides of the lower panel which are not provided with the arms 131. On the ends of the arms 131, after gradually approaching close to each other, stopping portions 132 which are parallel with the lower panel 30a are formed.

In order that both the panels 20a and 30a can be fastened together by the push button type fastener 100, firstly, the moving side panel 20a is overlapped on the fixed side panel 30a, and the stud 110 is pushed in the reverse direction of the pushing force of the spring 104, so that the cam 114 is guided along the inner surfaces of the resilient arms 131 and the tips of the resilient arms are pushed open. Thereafter, the distal portion 113 is passed through the opened portion with opening it further, so that the opposing flat surfaces of the wall portion 112 are rotated in such a manner that they are gripped between the resilient arms 131. Then, the pushing force for the stud 110 is released, so that the engaging surfaces 115 of the distal portion 113 are engaged with the stopping surfaces 132' of the stopping portions 132 so as not to be disengaged, as shown in FIG. 7, whereby the panels 20a and 30a are fastened to each other.

In order to open the moving side panel, the stud is rotated about 90° by using a driver or the like that engages the groove 123 of the tip of the stud. Then, as the tips of the resilient arms 131 are opened by the wall portion 112, wide enough to pass the distal portion 113, the stud 110 is drawn upwardly by the spring 104, whereby the moving side panel 20a can be opened.

In such a push button type fastener, however, it is disadvantageous that the stud must be rotated about 90° for its releasing action. In addition, machining is difficult because of the complicated configurations of the stud 110 and the tip of the socket.

Furthermore, it is disadvantageous that the stud assembly 101 and the socket 103 need fixing means such as the fixing ring 105 or the rivets or the like for attaching them to their respective panels. An excessive number of the parts is required, and an excessive amount of time is required to assemble them.

SUMMARY OF THE INVENTION

The present invention solves aforementioned disadvantages in the push button type fastener as described above, by directly connecting together the cam and the wall portion in a twisted relation, such that the rear side end surface of the cam is the engaging surface and the lengthwise end surfaces of the resilient arms are the stopping surfaces.

The operation of the fastener of the invention to fasten two panels together is basically the same as that of aforementioned fastener; however, the fastener of the invention is more easily manufactured and it can be released with less rotation angle of the stud.

The stud has a construction such that the cam and the wall portion are directly connected together in a twisted relation. The socket has lengthwise end surfaces that form the stopping surfaces, which are simply shaped and can be machined easily. In addition, the release of the panels can be carried out by rotating the stud only slightly.

The attachment of the socket to the fixed side panel is achieved using detents that expand by only pushing. Its attaching workability can thereby be enhanced.

The attachment of the stud assembly for the moving side panel also is achieved using detents that expand to engage the panel. This, too, enhances its attaching workability.

Other features and advantages of the present invention will be come apparent from the following description of the preferred embodiment, taken in conjunction with the accompanying drawings, which illustrate, by way of example, the principles of the invention.

BRIEF DESCRIPTION OF THE DRAWINGS

FIGS. 1-6 illustrate the preferred embodiment of the present invention.

FIG. 1 is a side elevational view of the preferred embodiment of a push button type fastener, shown in a fastened condition.

FIG. 2 is a perspective view of a stud assembly portion of the fastener of FIG. 1.

FIG. 3 is a front elevational view, partially in section, of the stud assembly, shown attached to a moving side panel.

FIG. 4 is a perspective view of the socket portion of the fastener of FIG. 1.

FIG. 5 is a side elevation of the socket.

FIG. 6 is a top plan view of the socket.

DESCRIPTION OF THE PREFERRED EMBODIMENTS

Figure 1:
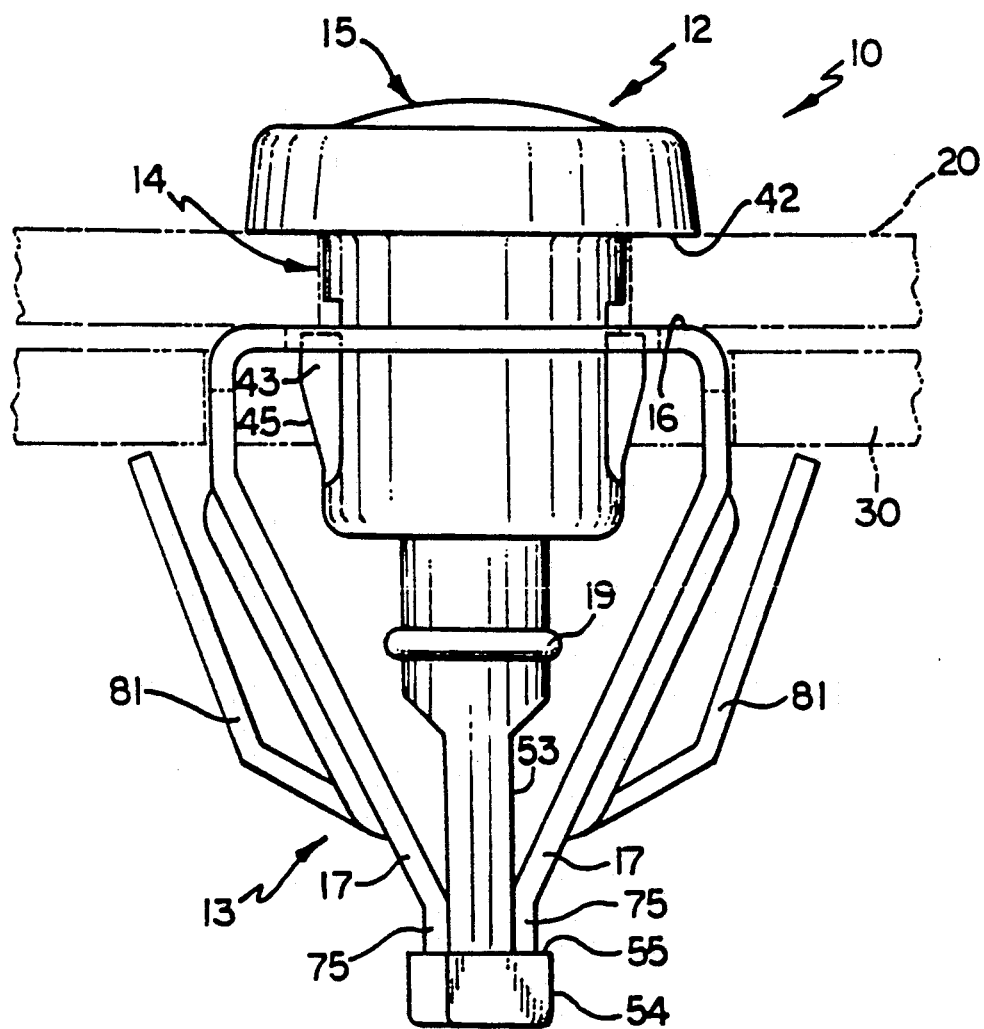

A push button type fastener 10 according to the present invention is used for fastening together a pair of panels 20 and 30 is shown in FIG. 1. This push button type fastener includes a stud assembly 12 and a socket 13. The stud assembly 12, which is attached to the moving side panel 20, is shown engaged with the socket 13, which is attached to the fixed side panel 30, to fasten the two panels together. The stud assembly 12 and the moving side panel 20, and the socket 13 and the fixed side panel 30, can be respectively treated as separate members just before usage, and they can be assembled easily by users.

Individual members will be described in detail as follows.

Figure 2:
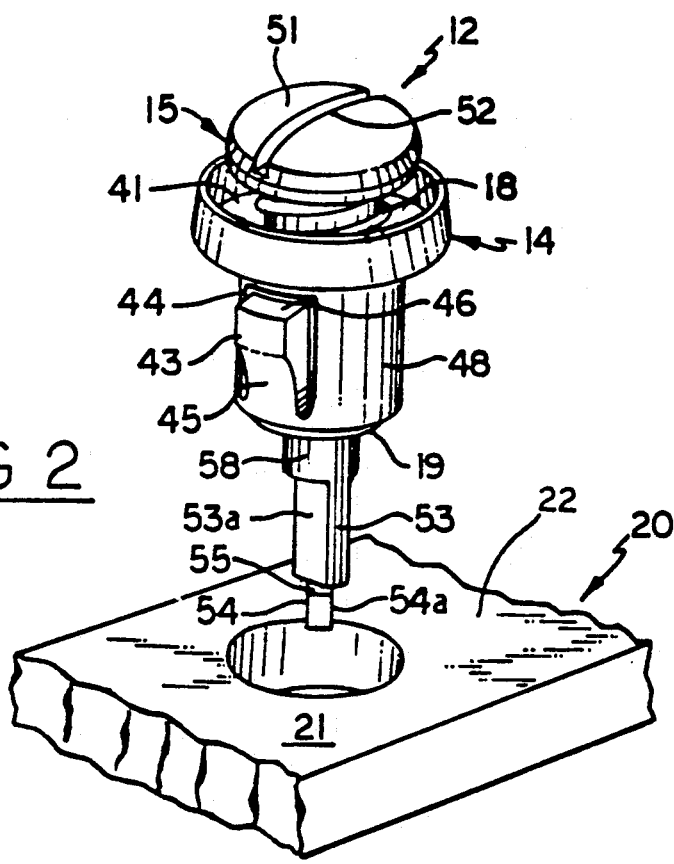
Figure 3:
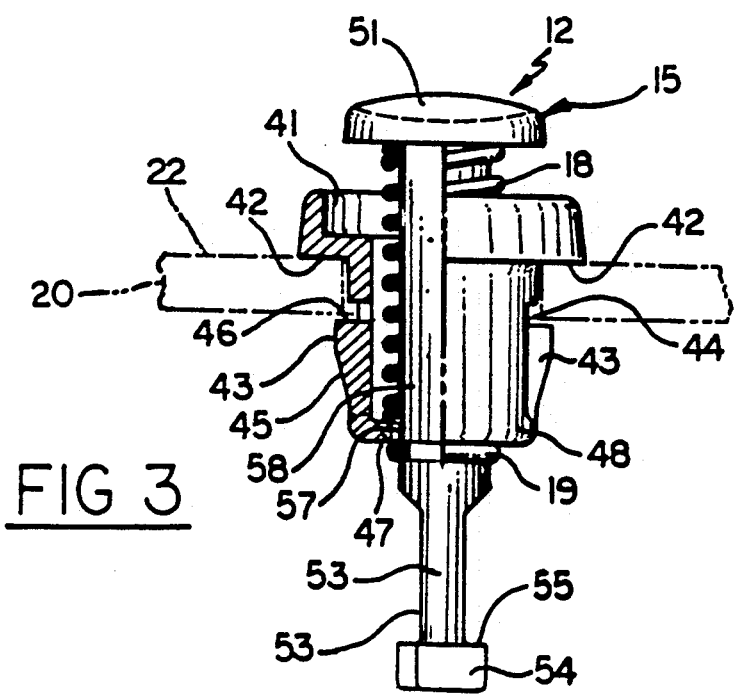
Figure 7:
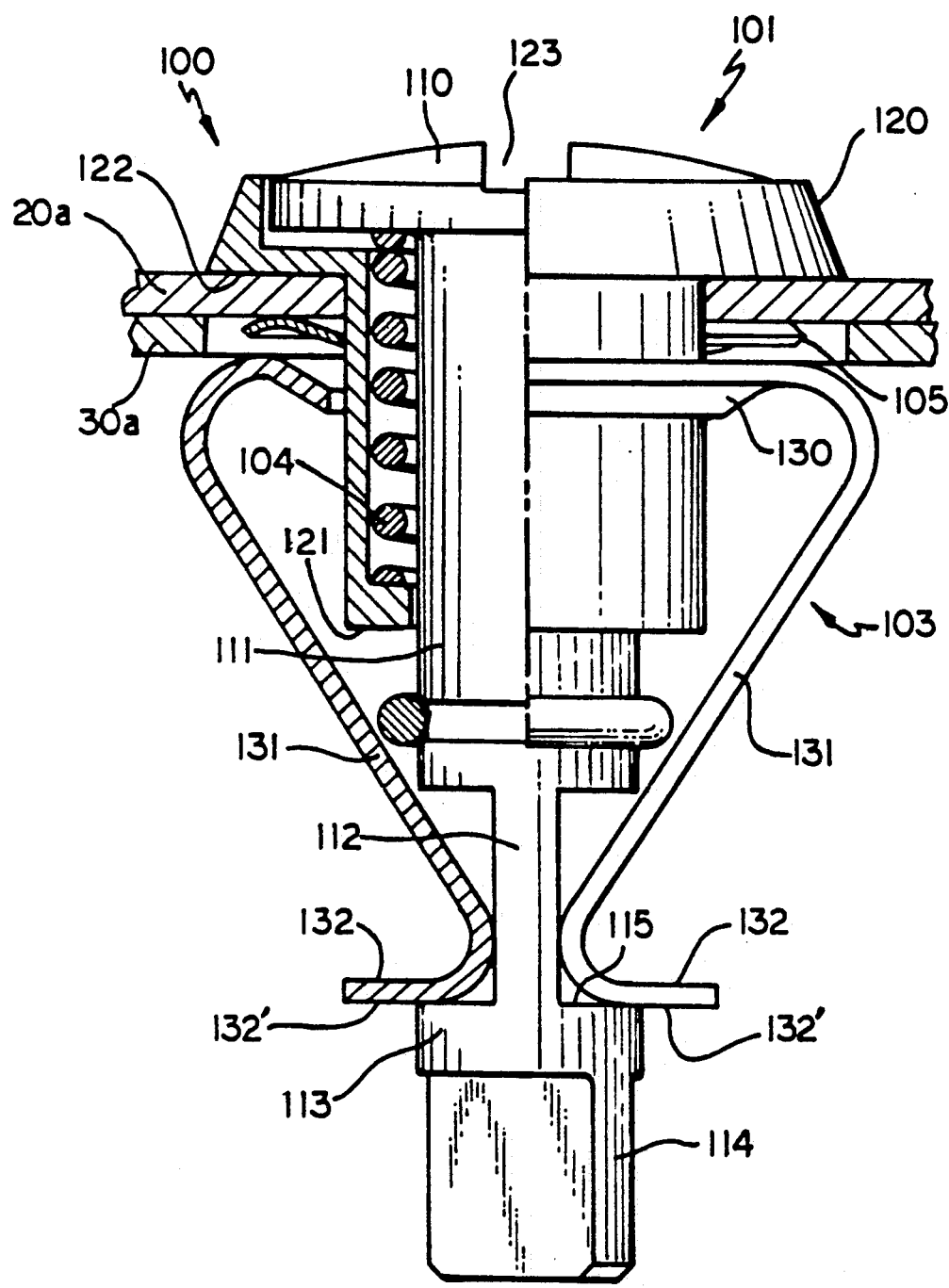
FIG. 7 is a front elevational view partially in section, of a prior art push button type fastener.
Figure 8:
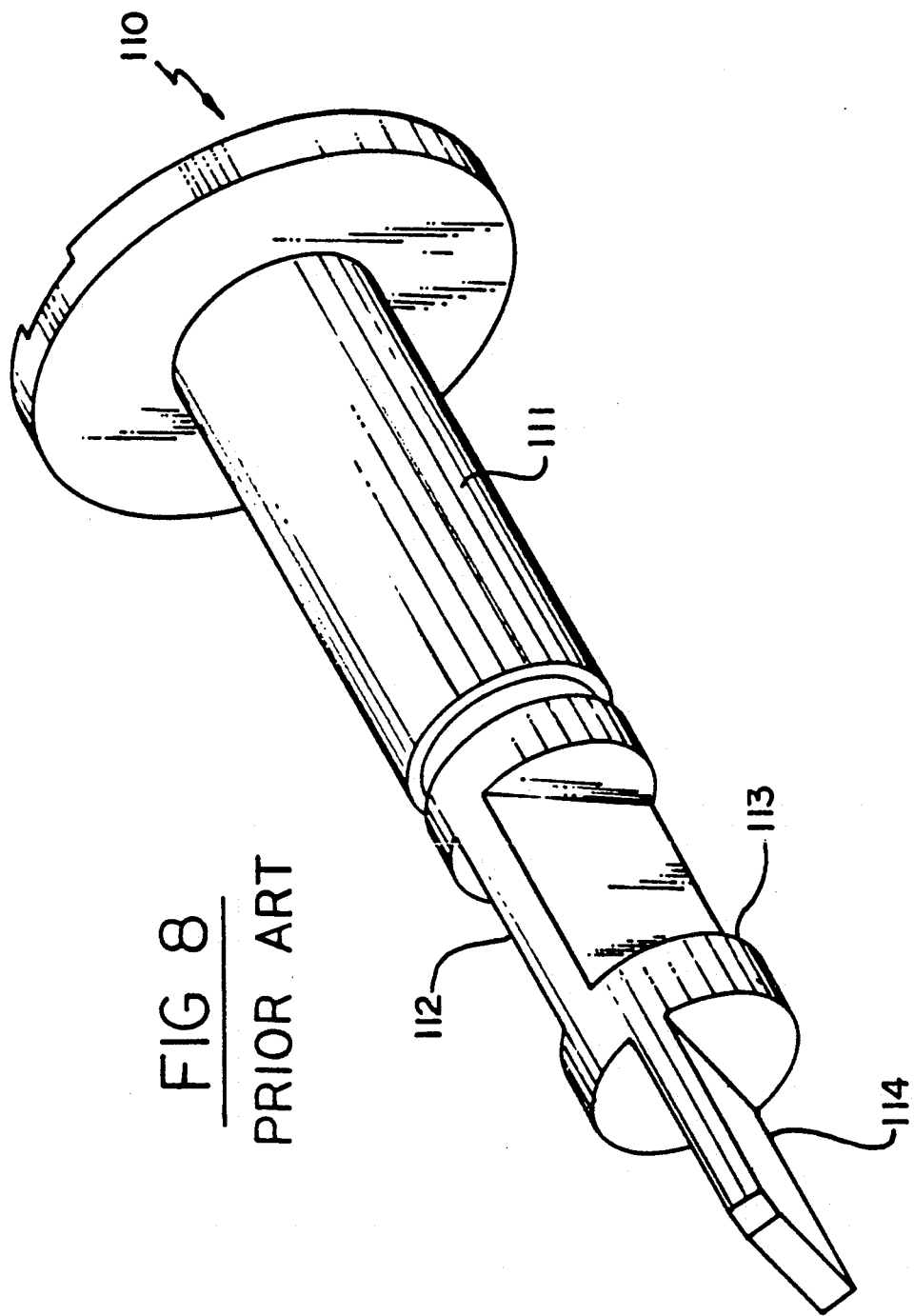
FIG. 8 is a perspective view of the stud portion of the fastener of FIG. 7.

As shown in FIGS. 2-3, the stud assembly 12 includes a housing 14, a stud 15, a spring 18 and a circlip 19.

The housing 14 is made of hollow plastic, and it includes at one end an axial recess 41 whose inner circumference is enlarged, and at another end a bottom portion 47 whose diameter is reduced. An outer circumferential surface 48 of the housing 14 is cut away rectangularly at two opposing places, and radially-movable elastically operating detents 43 are formed at these cut away portions 44. The detents have fulcrum sides near the outer circumference of the bottom portion 47. Only the outer diameter of the detents 43 is enlarged in the direction facing a flange portion 42 at the back of a recess 41, so that the detents deviate outwardly from the aperture 21 of the moving side panel 20. The outer side surfaces 45 of the detents work as guide surfaces for inserting them into the aperture 21. Then, the moving side panel 20 is gripped between the flange portion 42 and stopping surfaces 46 which are opposed to the flange portion and formed on the upper ends of the detents 43.

The stud 15 is inserted into the hollow portion of the housing 14. One end of the stud 15 includes a head 51, whose diameter is slightly less than the recess 41. A groove 52 is formed in the head 51, for rotating the stud 15. A cylindrical portion 58 extends from the head 51 through said housing 14, and it approaches close to the inner circumferential surface of the bottom portion 47. A wall portion 53 whose opposing outer circumference is cut away is connected to the cylindrical portion 58. A cam 54 is formed at the tip of the stud 15, opposite the head 51, and this cam is directly connected in a mutually twisted relation with the wall portion 53. Thereby, an engaging surface 55, which is at right angles to the axial direction of the stud at the back of the cam 54, serves as an engaging surface for the socket 13, as it will be described later.

Furthermore, the twisted angle between said cam 54 and said wall portion 53 is preferably 45°-55°. And such a twisted disposition can be formed easily by means of cold working with a press, not needing a time-consuming process such as welding.

The compression spring 18 is interposed between the bottom portion 47 and the head portion 51 of the stud 15 and around the cylindrical portion 58 so as to urge the housing 14 and the stud 15 apart from each other. In addition, a circumferential groove is formed on the cylindrical portion 58 of the stud 15, so that the circlip 19 is engaged therewith. The circlip 19 is of known type, preventing the housing 14 and the stud 15 known type, preventing the housing 14 and the stud 15 from being disassembled.

The aperture 21, which is larger than the outer circumference of the housing 14 but smaller than the outer diameters of the flange portion 42 and the detents 43, is provided for the moving side panel 20. When the stud assembly 12 is inserted into this aperture 21, the guide surfaces 45 of the detents 43 are compressed gradually in the radial direction along the inner circumference of the aperture 21, so that the detents 43 are reduced in diameter and passed therethrough. Thereafter, the detents 43 are returned to their original positions by means of elastic force. Thereby, the stud assembly 12 is attached to the moving side panel 20, between the flange 42 and the stopping surfaces 46 of the detents 43.

With reference now to FIGS. 4-6, the socket 13 includes a base portion 16 and a pair of resilient arms 17, and it is preferably machined and pressed from a sheet of spring steel. The arms 17 are connected to opposite sides of the rectangular base portion 16, so that the shape of the arms is almost an isosceles triangle, being seen from the front.

An aperture 61 for receiving the stud assembly 12 is bored in the base portion 16, and a pair of extended portions 62 that are engagable with the edges of the aperture 31 of the fixed side panel 30 are formed on the sides where the arms 17 are not defined. Thereby, the back surfaces of the extended portions 62 become attachment surfaces which come into contact with the upper surface 32 of the lower panel 30. The arms 17 include fitting portions 71 which extend in parallel with the axis of the aperture 61, resilient leg portions 73 which gradually approach to each other downwardly, and flat narrow pressing portions 75 which extend axially so as to sandwich the opposing flat surfaces 53a and 54a of the respective wall portion 53 and cam 54. Of course, the inner surfaces 74 of the resilient leg portions 73 also guide the wall portion 53 and the cam 54. In addition, the narrow pressing portions 75 may be in contact with each other, or they may be isolated with each other to approximately the same degree as the thickness of the wall portion 53 and the cam 54 of the stud assembly 12. Furthermore, the arms 17 are punched laterally, and they have elastically operating detents 81 having outside guide surfaces 82. These detents 81 open towards the base portion 16, and stopping surfaces 83 are formed on the upper ends thereof. The width of the pair of stopping surfaces 83, when no external force is applied to them, is larger than the width of the base portion and the aperture 31 of the lower panel 30.

The attachment of the socket 13 is performed by merely pushing it through the rectangular aperture 31 of the fixed side panel 30. When the socket 13 is inserted with the narrow pressing portions 75 facing forwardly, the guide surfaces 82 of the detents 81 are pressed towards the inner circumference of the aperture 31, and they pass through it with inward flexing, after which they elastically expand back to their original positions. The attachment surfaces of the extended portions 62 then come into contact with the upper surface 32 of the lower panel 30, and the lower panel is sandwiched between the attachment surfaces and the stopping surfaces 83 of the detents 81. The attachment is then completed.

In order that the moving side panel 20 can be fastened to the fixed side panel 30, firstly, the stud assembly 12 is attached to the moving side panel, and the socket 13 is attached to the fixed side panel. The stud 15 in this condition is urged upwardly by the compression spring 18, so that the head 51 protrudes upwardly from the recess 41 to a position where the circlip 19 contacts the bottom portion 47.

Next, the stud assembly 12 is inserted into the aperture 61 of the socket 13, and the panel 20 is overlapped on the panel 30. Then, the head 51 is pushed against the bias of the compression spring 18. The cam 54 is guided to the inner surfaces 74 of the resilient leg portions 73, and the narrow pressing portions 75 are expanded by the pushing power from the head. When the pushing power is released after the cam 54 has been pushed to pass through the narrow pressing portions 75, the pressing force of the resilient leg portions 73 works through the wall portion 53 of the stud 15 to rotate the stud to bring the stud's opposing flat surface 53a into linear contact with the narrow pressing portions 75. Since the wall portion 53 and the cam 54 are in a distorted relation, the stud 15 is rotated to a portion that the stopping surfaces 76 of the narrow pressing portions 75 come into contact with the engaging surface 55 of the cam 54. As the stud 15 returns upwardly by the pushing force of the spring, the steep stopping surfaces 76 of the narrow pressing portions 75 (see FIG. 5) are urged by the spring into compressive contact with the engaging surface 55 of the cam 54, and the panels 20 and 30 are thereby fastened together.

The releasing actions of the stud assembly 12 from the socket 13 are described as follows.

The head portion 51 of the stud 15 is rotated in either direction by inserting a driver or the like into the groove 52. The wall portion 53 thereupon expands the narrow pressing portions 75 to the passable width of the cam 54, so that the stopping surfaces 76 are no longer able to be engaged with the engaging surface 55. As the stud 15 is urged upward, it is drawn from the socket 13. The moving side panel 20 can thereby be opened.

It will be noted that there is a gap of the thickness of the socket 13 between the moving side panel 20 and the fixed side panel 30 when they are in the attached relationship of the FIG. 1. This gap is usually no more than 1 mm. If the gap must be eliminated, recesses for receiving the extended portions 62 of the base portion 16 can be provided for the fixed side panel 30.

Although the invention has been described in detail with reference only to the presently preferred embodiment, those of ordinary skill in the art will appreciate that various modifications can be made without departing from the invention. Accordingly, the invention is defined only by the following claims.

I claim:

1. A push button type fastener comprising:
   a stud assembly attachable to a moving side panel, said stud assembly including a stud with a cam at its tip, a wall portion at the rear position thereof and an engaging surface therebetween, and a spring; and
   said cam having two planar surfaces spaced apart a distance;
   a socket attachable to a fixed side panel, said socket including a base portion and a pair of resilient arms projecting angularly from said base portion and converging toward each other such that said base and said pair of arms substantially form a triangle, said resilient arms further having stopping surfaces at their tips;
   wherein said stud can be pushed between said pair of resilient arms, against the yielding bias of the spring, and then released so that said engaging surface is stopped at said stopping surfaces and said panels are fastened together;
   wherein said panels can be unfastened by rotating said stud;
   and wherein said cam and said wall portion of said stud assembly are directly connected together in a twisted relation without any intervening structure and the portion of said cam that is immediately adjacent said wall portion forms said engaging surface, said engaging surface having a thickness substantially equal to the distance between the two planar surfaces of said cam.

2. A push button type fastener according to claim 1, wherein:
   said resilient arms are provided with elastically operating detents;
   said base portion is flat and parallel with said fixed side panel of said socket and is provided with extended portions that are engaged with the edges of an aperture being bored in the panel; and
   said socket is attached to said fixed side panel by means of said detents and said extended portions.

3. A push button type fastener according to claim 2, wherein:
   said stud assembly further includes a housing which is provided with a flange portion and at least two elastically operating detents; and
   said housing is attached to said moving side panel by means of said detents and said flange portion.

4. A push button type fastener according to claim 1, wherein:
   said stud assembly further includes a housing which is provided with a flange portion and at least two elastically operating detents; and
   said housing is attached to said moving side panel by means of said detents and said flange portion.

5. A push button type fastener according to claim 1, wherein the base portion and pair of resilient arms of said socket are formed from a single sheet of material.

* * * * *

Disclaimer and Dedication

5,011,355.—*Inaba Motoshige*, Kanagawa, Japan. PUSH BUTTON VALVE FASTENER RELEASABLE BY ROTATION. Patent dated Apr. 30, 1991. Disclaimer filed Mar. 9, 1992, by the assignee, VSI Corp.

Hereby disclaims and dedicates to the public all claims of said patent.